US012603852B2

(12) United States Patent
Liu et al.

(10) Patent No.: US 12,603,852 B2
(45) Date of Patent: Apr. 14, 2026

(54) PACKET FORWARDING SYSTEM AND ASSOCIATED PACKET FORWARDING METHOD

(71) Applicant: Realtek Semiconductor Corp., HsinChu (TW)

(72) Inventors: Heng-Xiu Liu, HsinChu (TW); Chen-Feng Kuo, HsinChu (TW); Lun-Wu Yeh, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 441 days.

(21) Appl. No.: 18/198,839

(22) Filed: May 17, 2023

(65) Prior Publication Data

US 2023/0388253 A1 Nov. 30, 2023

(30) Foreign Application Priority Data

May 24, 2022 (TW) .................................. 111119317

(51) Int. Cl.
*H04L 49/901* (2022.01)
*H04L 49/00* (2022.01)
(52) U.S. Cl.
CPC ........ *H04L 49/901* (2013.01); *H04L 49/3009* (2013.01)

(58) Field of Classification Search
CPC .......................... H04L 49/901; H04L 49/3009
See application file for complete search history.

(56) References Cited

U.S. PATENT DOCUMENTS

| | | | |
|---|---|---|---|
| 6,751,225 B1 | 6/2004 | Chung | |
| 9,154,453 B2 * | 10/2015 | Michels | ................ H04L 49/901 |
| 11,595,345 B2 * | 2/2023 | Wang | ................... H04L 61/2521 |
| 12,010,043 B2 * | 6/2024 | Dugas | .................... H04L 49/602 |
| 2004/0073694 A1 * | 4/2004 | Frank | ....................... H04L 47/20 |
| | | | 370/412 |
| 2014/0153582 A1 * | 6/2014 | Jones | .................. H04L 47/2441 |
| | | | 370/417 |
| 2022/0206969 A1 * | 6/2022 | Que | ..................... G06F 13/1684 |

* cited by examiner

*Primary Examiner* — Mounir Moutaouakil
(74) *Attorney, Agent, or Firm* — Winston Hsu

(57) ABSTRACT

The present invention provides a packet forwarding system including a packet, a packet analyzer and a DMA module. The packet buffer is configured to receive a packet and store the packet. The packet analyzer is configured to read the packet from the packet buffer, and analyze the packet to extract part of content of the packet to generate specific data. The DMA module is configured to write the specific data into a first buffer of a storage device, and write the packet into a second buffer of the storage device.

12 Claims, 7 Drawing Sheets

PACKET FORWARDING SYSTEM AND ASSOCIATED PACKET FORWARDING METHOD

BACKGROUND OF THE INVENTION

1. Field of the Invention

The present invention relates to a packet forwarding system.

2. Description of the Prior Art

In the process of packet generation, a header of each layer in the Internet protocol will be positioned before a payload. Therefore, the packet may comprise at least a portion of a wireless media access control (Wi-Fi MAC) header, an Ethernet header, and a transmission control protocol (TCP) header. In addition, when a router or a switch needs to forward a received packet, the entire packet needs to be sent to a processor in the router or the switch for header analysis to determine a destination for the entire packet to be forwarded. However, because the destination of the packet to be forwarded needs to be known after the processor receives the entire packet and analyzes it, it will affect the performance of the router or the switch.

SUMMARY OF THE INVENTION

It is therefore an objective of the present invention to provide a packet forwarding system, which can extract a plurality of headers of the packet first, and send the plurality headers to the processor for analysis to know in advance the destination of the packet to be forwarded, so as to speed up the packet forwarding process and improve performance.

According to one embodiment of the present invention, a packet forwarding system comprising a packet, a packet analyzer and a direct memory access (DMA) module is disclosed. The packet buffer is configured to receive a packet and store the packet. The packet analyzer is configured to read the packet from the packet buffer, and analyze the packet to extract part of content of the packet to generate specific data. The DMA module is configured to write the specific data into a first buffer of a storage device, and write the packet into a second buffer of the storage device.

According to one embodiment of the present invention, a packet forwarding method comprises the steps of: receiving a packet and storing the packet into a packet buffer; reading the packet from the packet buffer, and analyzing the packet to extract part of content of the packet to generate specific data; and writing the specific data into a first buffer of a storage device, and writing the packet into a second buffer of the storage device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
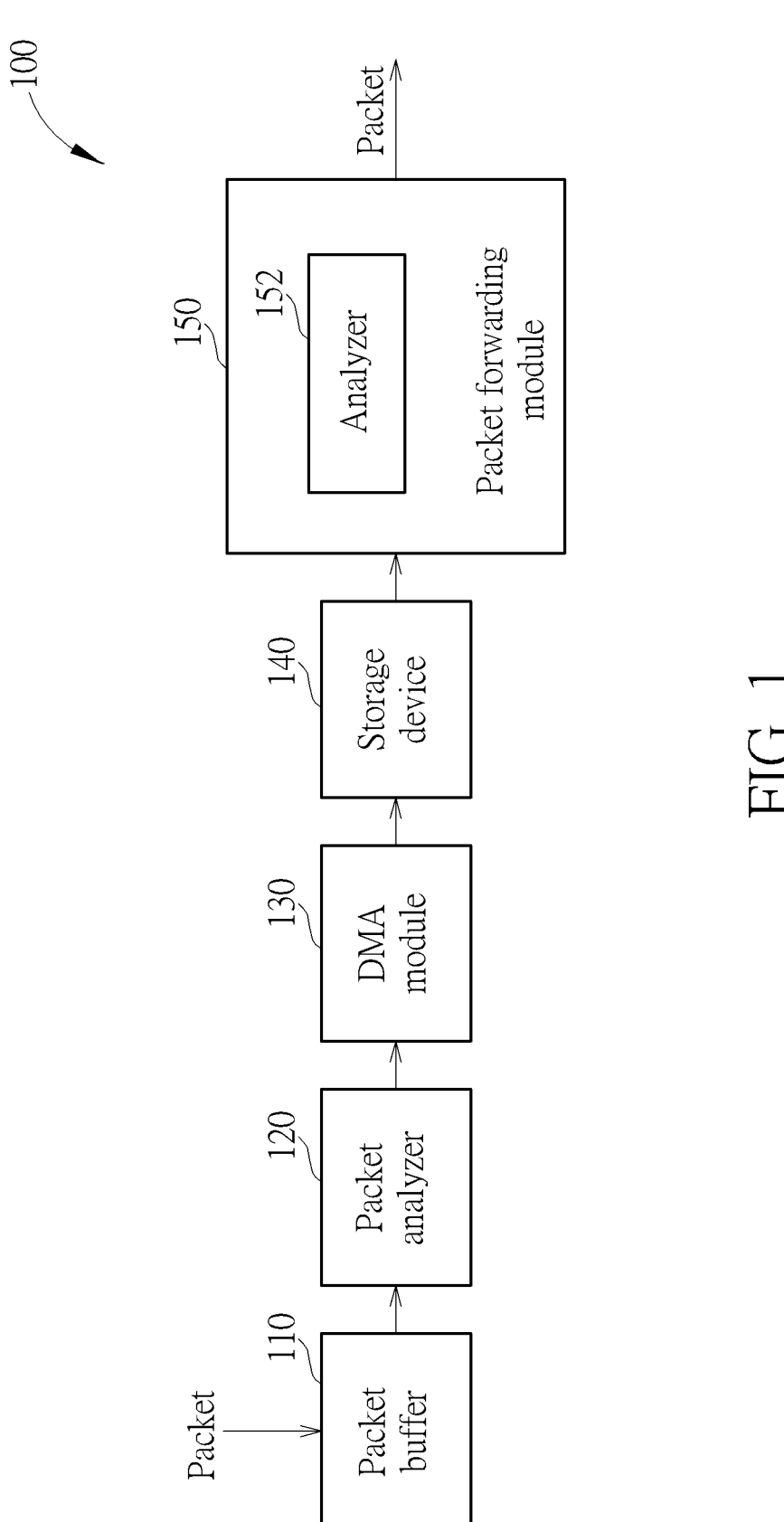
FIG. 1 is a diagram illustrating a packet forwarding system according to one embodiment of the present invention.

FIG. 1 is a diagram illustrating a packet forwarding system 100 according to one embodiment of the present invention. As shown in FIG. 1, the packet forwarding system 100 comprises a packet buffer 110, a packet analyzer 120, a direct memory access (DMA) module 130, a storage device 140 and a packet forwarding module 150, wherein the packet forwarding module 150 comprises an analyzer 152, and the analyzer 152 can be implemented by using a processor. In addition, each of the elements in the packet forwarding system 100 can be implemented by using circuits. In this embodiment, the packet forwarding system 100 can be set in any electronic device that needs to receive packets and transmit the packets to another communication port or communication protocol, for example, the packet forwarding system 100 can be set in a router, a switch, a network card or an electronic device serving as an access point (AP).

In one embodiment, the packet buffer 110, the packet analyzer 120 and the DMA module 130 can be arranged in a communication chip, and the packet forwarding module 150 can be arranged in a system chip. The storage device 140 may include one or more memory device, and may be disposed within the packet forwarding module 150 and/or connected externally to the packet forwarding module 150, but the present invention is not limited thereto.

Figure 2:
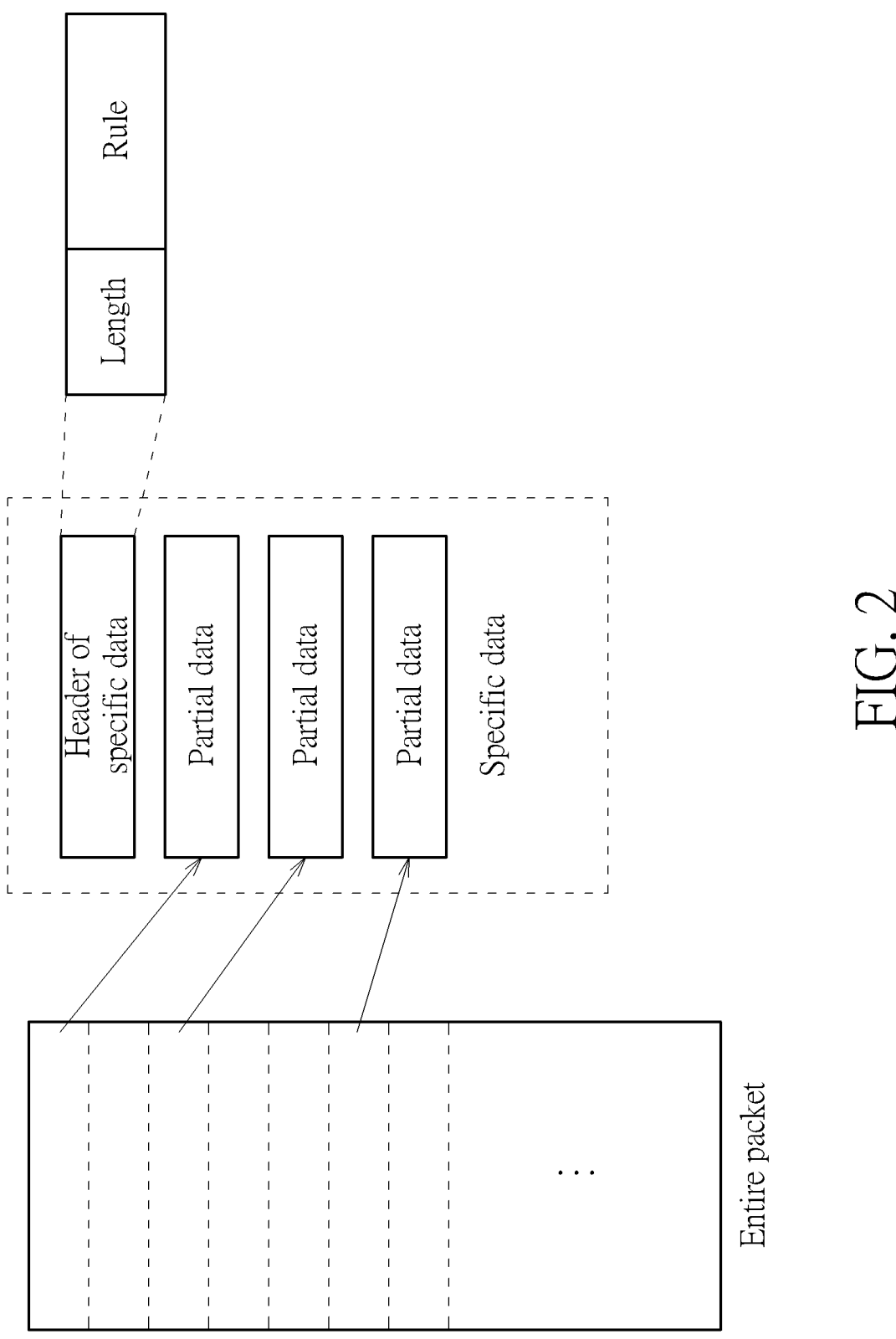
FIG. 2 is a diagram of extracting part of the content of the packet to generate specific data.

In the operation of the packet forwarding system 100, the packet buffer 110 receives packets from an external device, and temporarily stores the received packets therein, wherein the received packets can be from. Ethernet or wireless network. Then, the packet analyzer 120 analyzes the packets stored in the packet buffer 110 to obtain part of the contents of the packets and generate specific data. Specifically, referring FIG. 2, the packets stored in the packet buffer 110 have a plurality of different blocks, wherein these blocks may include at least part of a Wi-Fi MAC header, an Ethernet header, a TCP header and payload. The packet analyzer 120 will analyze/parse the entire packet to determine a plurality of specific blocks, wherein these specific blocks can be at least part of the Wi-Fi MAC header, the Ethernet header and the TCP header. Afterwards, the packet analyzer 120 obtains at least a part of data from the plurality of specific blocks for generating the specific data. For example, FIG. 2 shows three partial data (only as an example), wherein the first partial data may include at least part of data of the Wi-Fi MAC header, such as information of a source address and a destination address; the second partial data may include at least part of data of the Ethernet header, such as information of the source address and the destination address; and the third partial data may include at least part of data of the TCP header. In addition, according to the contents of the above-mentioned three partial data, the packet analyzer 120 further establishes a specific data header, which includes a length of the entire specific data and rule(s), wherein the rule indicates which headers are included in the specific data.

After establishing the specific data corresponding to the packets, the DMA module 130 writes the specific data and the corresponding packets into the storage device 140, respectively. Specifically, referring to FIG. 3, assuming that the storage device 140 includes a first memory 310 and a second memory 320, wherein the first memory 310 has a plurality of descriptors such as 312_1, 312_2 and 312_3, and each descriptor points to a buffer, for example, the descriptor 312_1 points to the buffer 314_1, the descriptor 312_2 points to the buffer 314_2, . . . etc. The second memory 320 has a plurality of descriptors such as 322_1, 322_2 and 322_3, and each descriptor points to a buffer, for example, the descriptor 322_1 points to the buffer 324_1, the descriptor 322_2 points to the buffer 324_2, . . . etc. FIG. 4 is a diagram illustrating a descriptor 410 and a buffer 420 according to one embodiment of the present invention, wherein descriptor 410 can be anyone of the descriptors 312_1, 312_2, 312_3, 322_1, 322_2, 322_3, the buffer 420 can be any one of the buffers 314_1, 314_2, 324_1 and 324_2, and the descriptor 410 mainly includes a buffer address (e.g., a starting address in the memory) and a buffer length of the buffer 420. In one embodiment, the first memory 310 may be a faster memory, such as a static random access memory (SRAM), and is mainly used to store the above-mentioned specific data. That is, the DMA module 130 will read the descriptor 312_1 first to obtain the buffer address and the buffer length of the corresponding buffer 314_1, and then the DMA module 130 writes the specific data #0 into the buffer 314_1 according to the buffer address of the buffer 314_1. Then, when all the contents of the specific data #0 are written into the buffer 314_1, the DMA module 130 generates descriptor information as shown in FIG. 4, and writes the descriptor information into a header of the buffer 314_1. In one embodiment, the descriptor information may include a sequence tag, a packet tag and a data length, wherein the sequence tag may be a strictly increasing sequence, that is, the specific data #0 of the first packet has a serial number '1', specific data #1 of the second packet has sequence number '2', specific data #2 of the third packet has sequence number '3', . . . and so on; the packet tag can be any information that can be used to identify which packet the specific data #0 corresponds to; and the data length is a size of the descriptor information. In this embodiment, since the sequence tag is located in the descriptor information, and the descriptor information is the last data written in the buffer, the packet forwarding module 150 can accurately determine whether the data has been completely written into the buffer by confirming whether the sequence tag in the buffer is strictly increased. For example, assuming that the sequence tag of the descriptor information in the buffer 314_1 is "10", then if the sequence tag of the descriptor information in the buffer 314_2 is "11", the packet forwarding module 150 can confirm that the specific data has been completely written into the buffer 314_2; otherwise, if the sequence tag of the descriptor information in the buffer 314_2 is not "11", the packet forwarding module 150 will determine that the specific data has not been completely written into the buffer 314_2.

After processing the specific data #0, the DMA module 130 reads the next descriptor 312_2, and writes the specific data #1 and descriptor information corresponding to the next packet into the buffer 314_2. Similarly, the DMA module 130 can sequentially read the descriptors in the first memory 310 and write subsequent specific data into the buffers, and when the last descriptor is processed, the DMA module 130 will start reading from the first descriptor 312_1 again.

In this embodiment, the second memory 320 can be a slower memory, such as a dynamic random access memory (DRAM), and is mainly used to store complete packets (i.e., entire contents of the packets). That is, the DMA module 130 will read the descriptor 322_1 first to obtain the buffer address and the buffer length of the corresponding buffer 324_1, and then the DMA module 130 writes the packet #0 into the buffer 324_1 according to the buffer address of the buffer 324_1. Then, when all the contents of the packet #0 are written into the buffer 324_1, the DMA module 130 generates descriptor information as shown in FIG. 4, and writes the descriptor information into a header of the buffer 324_1. In one embodiment, the descriptor information may include a sequence tag, a packet tag and a data length, wherein the sequence tag may be a strictly increasing sequence, the packet tag can be any information that can be used to identify the packet #0, and the data length is a size of the descriptor information.

After processing the packet #0, the DMA module 130 reads the next descriptor 322_2, and writes the packet #1 and descriptor information into the buffer 324_2. Similarly, the DMA module 130 can sequentially read the descriptors in the second memory 320 and write subsequent packets into the buffers, and when the last descriptor is processed, the DMA module 130 will start reading from the first descriptor 322_1 again.

Figure 5:
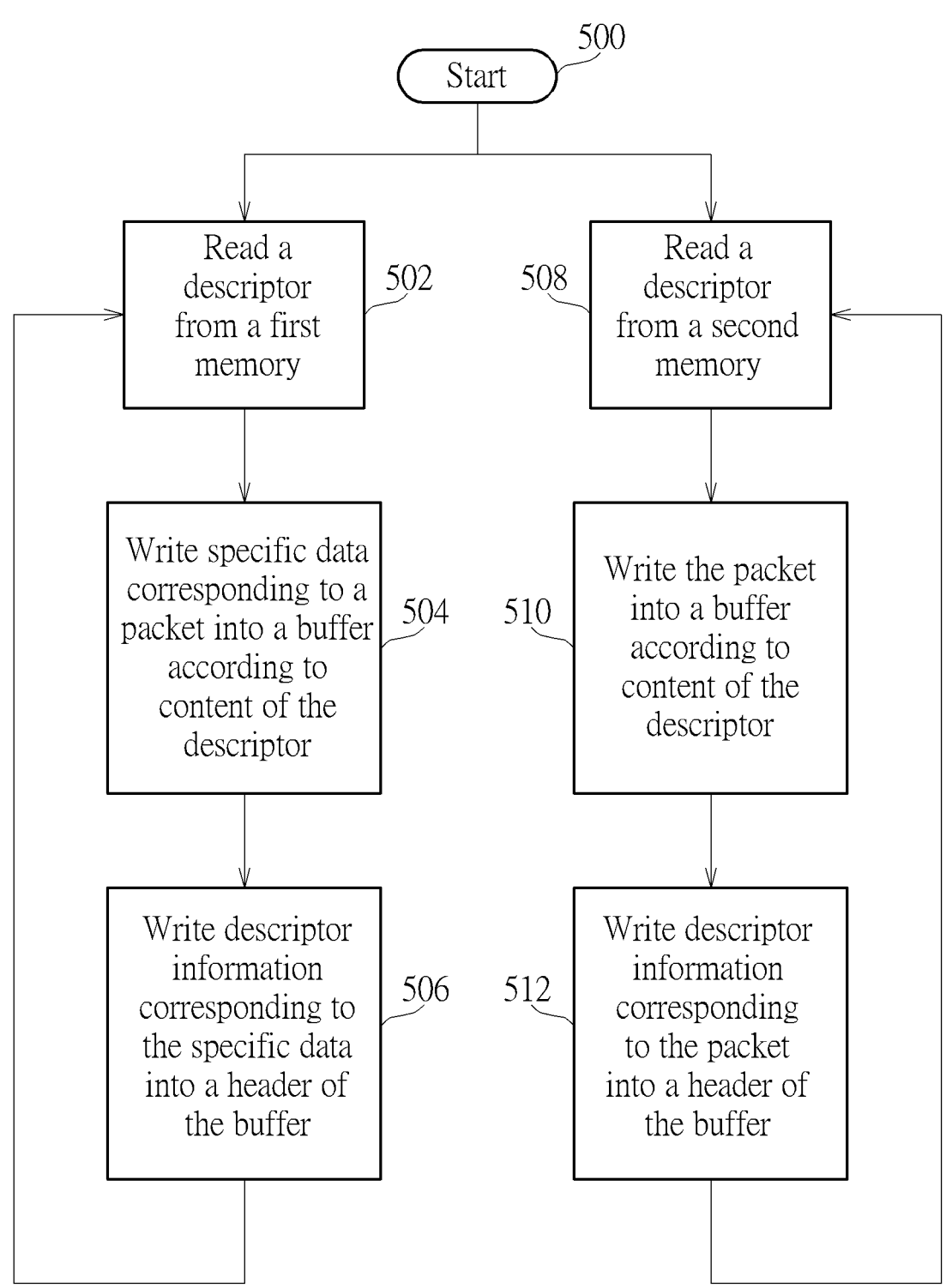
FIG. 5 is a flowchart of a packet forwarding method according to one embodiment of the present invention.

FIG. 5 is a flowchart of a packet forwarding method according to one embodiment of the present invention. Referring to the above embodiments, the flow is described as follows.

Step 500: the flow starts.

Step 502: read a descriptor from a first memory.

Step 504: write specific data corresponding to a packet into a buffer according to content of the descriptor.

Step 506: write descriptor information corresponding to the specific data into a header of the buffer.

Step 508: read a descriptor from a second memory.

Step 510: write the packet into a buffer according to content of the descriptor.

Step 512: write descriptor information corresponding to the packet into a header of the buffer.

Steps 502-506 and Steps 508-512 in FIG. 5 can be performed independently, that is, the DMA module 130 can determine a time of writing the specific data into the first memory 310 and a time of writing the entire packet into the second memory 320 according to its own schedule or other considerations.

In this embodiment, since the size of the specific data #0 is much smaller than the size of the packet #0, the specific data #0 will be written into the first memory 310 earlier. Therefore, the analyzer 152 in the packet forwarding module 150 can directly analyze the specific data #0 to know in advance the destination of the packet #0 to be forwarded, even if the current packet #0 has not been completely written into the second memory 320. Then, after analyzing the specific data #0 to know the destination of the packet #0 to be forwarded, the packet forwarding module 150 can directly read the packet #0 from the second memory 320 and forward it to the destination without analyzing the entire packet #0. In another embodiment, after analyzing/parsing the specific data #0 to know the destination of the packet #0 to be forwarded, the packet forwarding module 150 may not need to read the packet #0 from the second memory 320 for analysis/parsing, and the packet #0 will be directly forwarded to the destination, wherein the descriptor information corresponding to the packet #0 can be removed or replaced with other identifiable headers.

In one embodiment, if the analyzer 152 in the packet forwarding module 150 has completed analyzing/parsing the specific data #0 to know the destination of the packet #0 to be forwarded, but the packet #0 has not been completely written into the second memory 320, the analyzer 152 in the packet forwarding module 150 can continue to analyze the specific data #1 to know in advance the destination of the packet #1 to be forwarded.

As mentioned above, by extracting part of the data in the packet to generate specific data, and writing the specific data to the storage device 140, the packet forwarding module 150 can quickly analyze the specific data in advance to know the destination of the packet to be forwarded, and the subsequent packet forwarding module 150 can forward the packet to the correct destination without parsing the entire packet, so the packet forwarding efficiency can be effectively improved.

Figure 3:
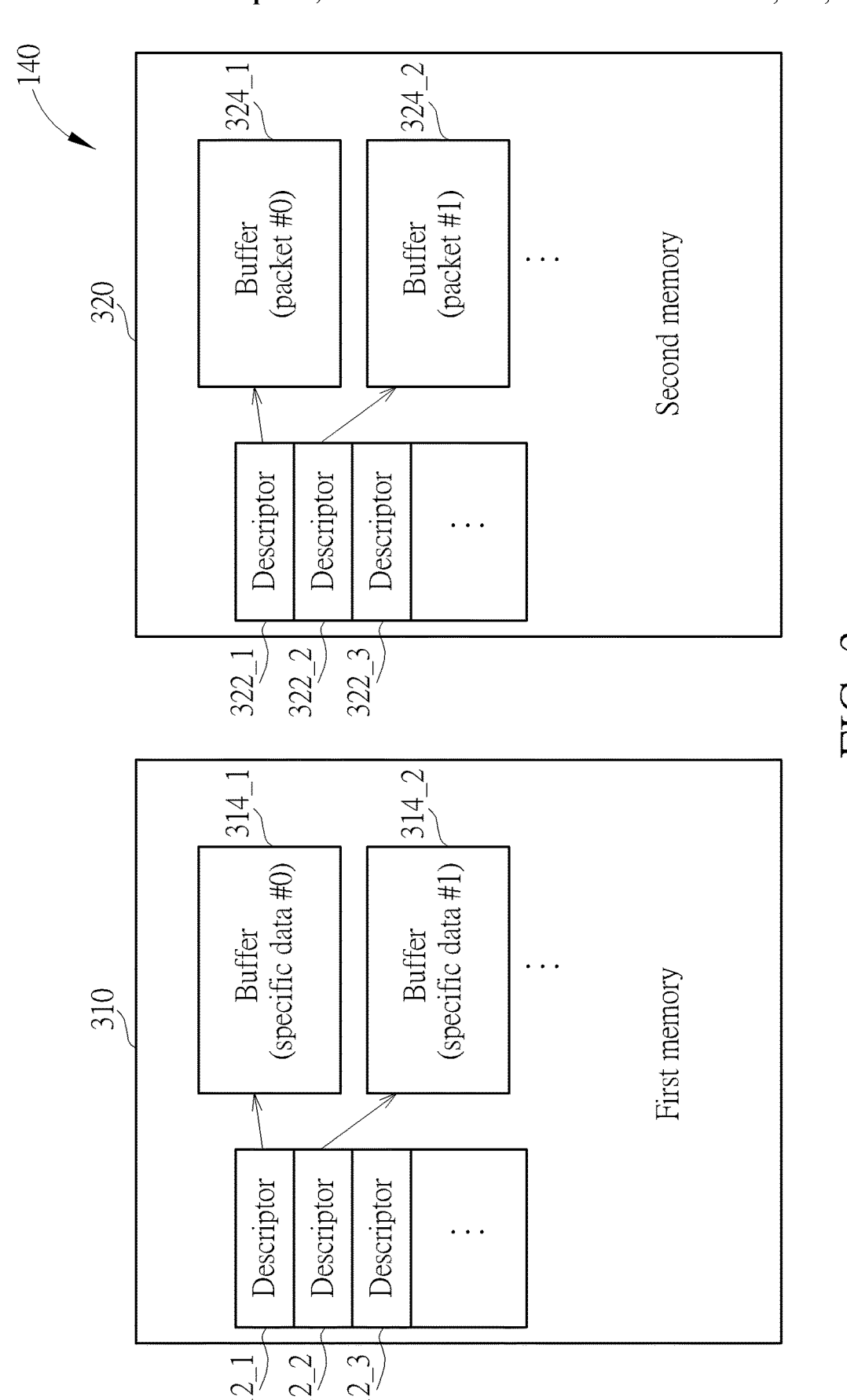
FIG. 3 is a schematic diagram of writing specific data and packets into a first memory a second memory respectively according to one embodiment of the present invention.
Figure 4:
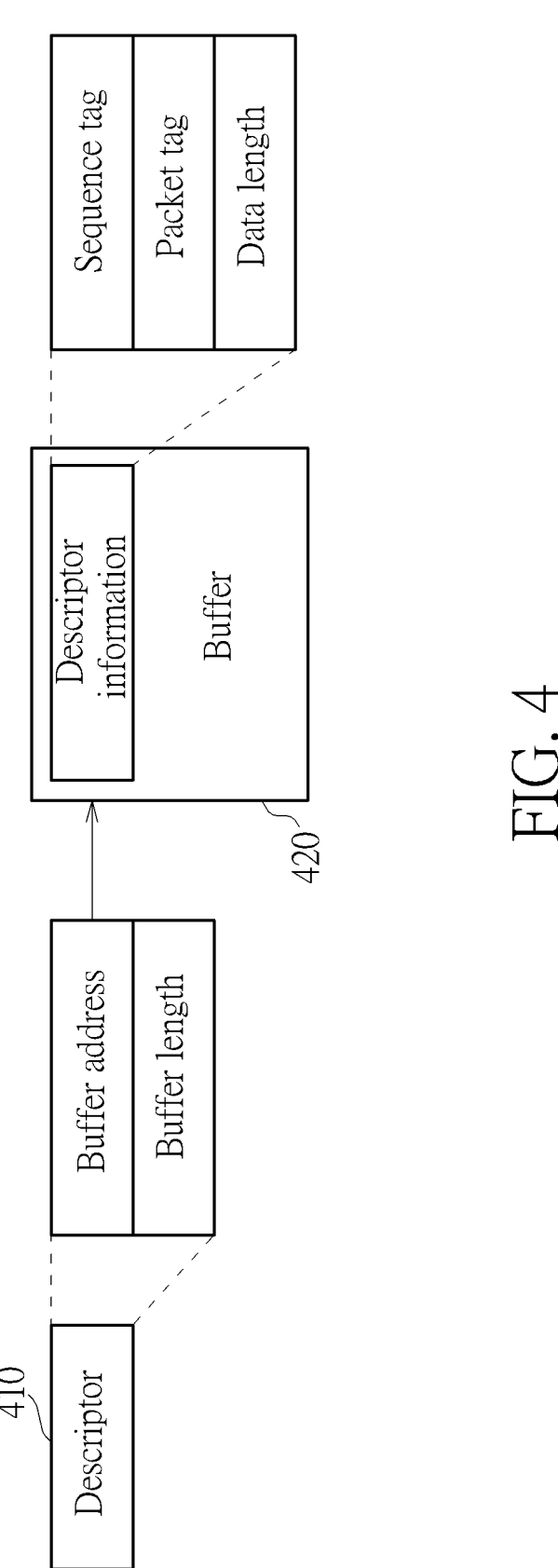
FIG. 4 is a diagram illustrating a descriptor and a buffer according to one embodiment of the present invention.
Figure 6:
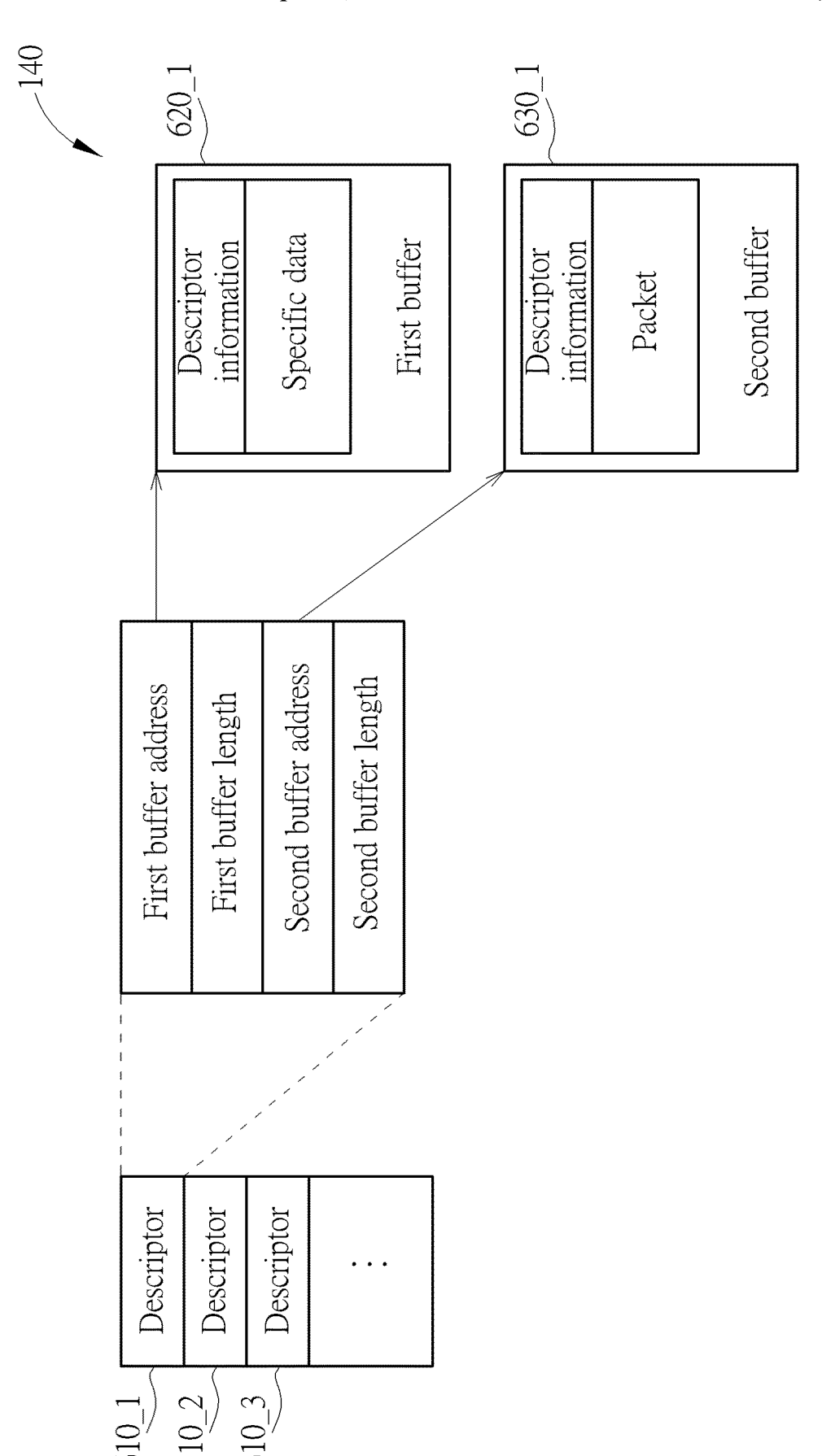
FIG. 6 is a schematic diagram of writing specific data and packets into a first buffer a second buffer respectively according to one embodiment of the present invention.

In the above embodiments of FIG. 3-FIG. 5, the specific data and corresponding packets are written into different memories through different descriptors, however, this feature is not a limitation of the present invention. In other embodiments of the present invention, the specific data and corresponding packets can be written into different buffers through the same descriptor. Referring to FIG. 6, the storage device 140 includes a plurality of descriptors such as 610_1, 610_2 and 610_3, and each descriptor points to two buffers. Specifically, the descriptor 610_1 may include a first buffer address, a first buffer length, a second buffer address and a second buffer length, wherein the first buffer address is a starting address of the first buffer 620_1, and the second buffer address is a starting address of a second buffer 630_1. After establishing the specific data #0 corresponding to the packet, the DMA module 130 will first read the content of the descriptor 610_1 to obtain the first buffer address and the first buffer length of the corresponding first buffer 620_1, and the second buffer address and the second buffer length of the second buffer 630_1. Then, the DMA module 130 writes the specific data #0 into the first buffer 620_1 according to the first buffer address of the first buffer 620_1; and when all the contents of the specific data #0 are written into the first buffer 620_1, the DMA module 130 generates descriptor information and writes the descriptor information into a header of the first buffer 620_1. Then, the DMA module 130 writes the packet #0 into the second buffer 630_1 according to the second buffer address of the second buffer 630_1; and when all the contents of the packet #0 are written into the second buffer 630_1, the DMA module 130 generates descriptor information and writes the descriptor information into a header of the second buffer 630_1.

Figure 7:
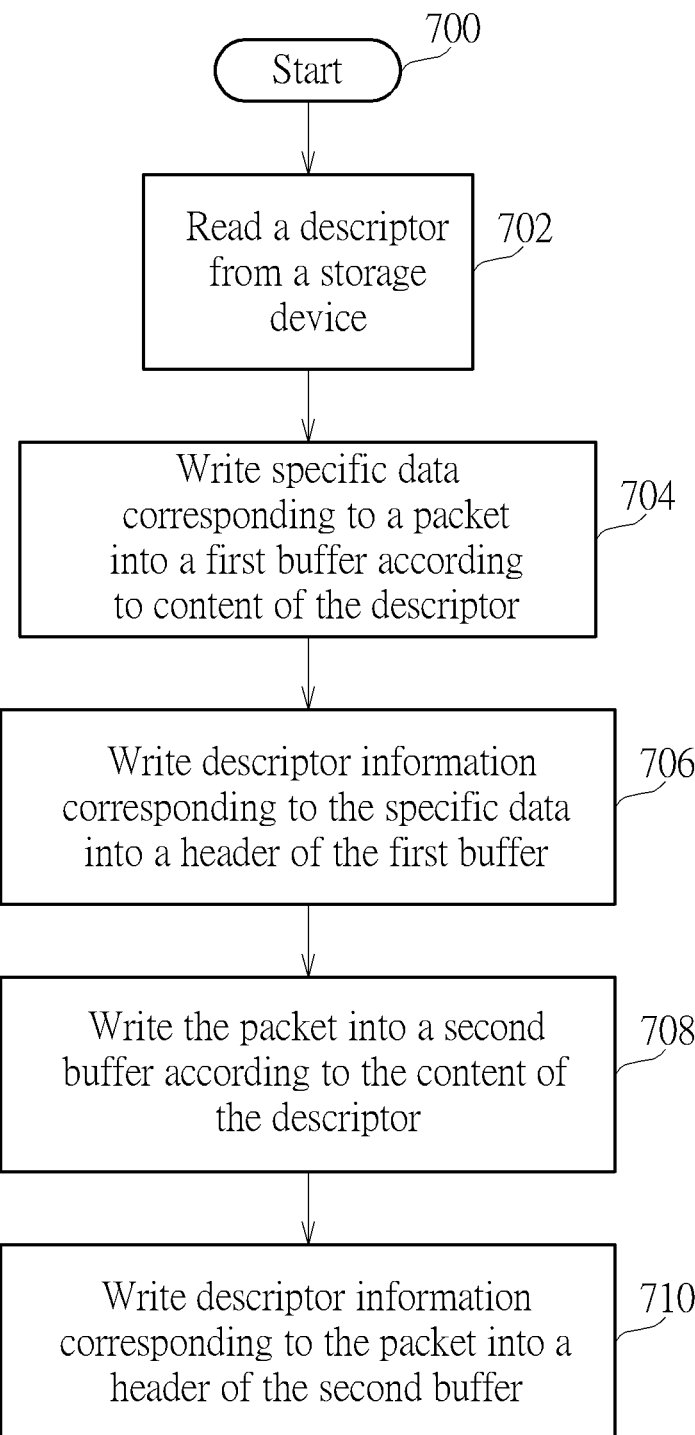
FIG. 7 is a flowchart of a packet forwarding method according to one embodiment of the present invention.

FIG. 7 is a flowchart of a packet forwarding method according to one embodiment of the present invention. Refer to the embodiment shown in FIG. 6, the flow is described as follows.

Step 700: the flow starts.

Step 702: read a descriptor from a storage device.

Step 704: write specific data corresponding to a packet into a first buffer according to content of the descriptor.

Step 706: write descriptor information corresponding to the specific data into a header of the first buffer.

Step 708: write the packet into a second buffer according to the content of the descriptor.

Step 710: write descriptor information corresponding to the packet into a header of the second buffer.

Briefly summarized, in the packet forwarding system of the present invention, by extracting part of the data in the packet to generate specific data, and writing the specific data into the storage device, the back-end packet forwarding module can quickly analyze the specific data in advance to know the destination of the packet to be forwarded, and the packet forwarding module can forward the packet to the correct destination without analyzing the entire packet, so the efficiency of packet forwarding can be effectively improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A packet forwarding system, comprising:
a packet buffer, configured to receive a packet and store the packet;
a packet analyzer, configured to read the packet from the packet buffer, and analyze the packet to extract part of content of the packet to generate specific data; and
a direct memory access (DMA) module, configured to write the specific data into a first buffer of a storage device, and write the packet into a second buffer of the storage device;
wherein the storage device comprises a plurality of first descriptors and corresponding first buffers, and a plurality of second descriptors and corresponding second buffers; the DMA module reads one of the plurality of first descriptors, and writes the specific data into the corresponding first buffer according to content of the first descriptor; and the DMA module reads one of the plurality of second descriptors, and writes the packet into the corresponding second buffer according to the content of the second descriptor;
wherein the storage device comprises a first memory and a second memory, a speed of the first memory is faster than a speed of the second memory, the plurality of first descriptors and the corresponding first buffers are in the first memory, and the plurality of second descriptors and the corresponding second buffers are in the second memory.

2. The packet forwarding system of claim 1, wherein the specific data comprises a source address of the packet and a destination address of the packet to be forwarded.

3. The packet forwarding system of claim 1, wherein the packet analyzer analyzes the packet to extract at least part of headers corresponding to a plurality of layers in an Internet Protocol to generate the specific data.

4. The packet forwarding system of claim 3, wherein the packet analyzer analyzes the packet to extract at least part of a wireless media access control (Wi-Fi MAC) header, an Ethernet header and a transmission control protocol (TCP) header, to generate the specific data.

5. The packet forwarding system of claim 1, further comprising:
a packet forwarding module, configured to read the specific data from the first buffer, and analyze the specific data to obtain a destination of the packet to be forwarded; and in a case of not analyzing the packet, read the packet from the second buffer, and forward the packet according to the destination.

6. A packet forwarding system, comprising:
a packet buffer, configured to receive a packet and store the packet;

a packet analyzer, configured to read the packet from the packet buffer, and analyze the packet to extract part of content of the packet to generate specific data; and a direct memory access (DMA) module, configured to write the specific data into a first buffer of a storage device, and write the packet into a second buffer of the storage device;

wherein the storage device comprises a plurality of first descriptors and corresponding first buffers, and a plurality of second descriptors and corresponding second buffers; the DMA module reads one of the plurality of first descriptors, and writes the specific data into the corresponding first buffer according to content of the first descriptor; and the DMA module reads one of the plurality of second descriptors, and writes the packet into the corresponding second buffer according to the content of the second descriptor;

wherein the DMA module further writes first descriptor information into the first buffer, wherein the first descriptor information comprises a sequence tag, a packet tag and a length of the first descriptor information; and the DMA module further writes second descriptor information into the second buffer, wherein the second descriptor information comprises the sequence tag, the packet tag and a length of the second descriptor information.

7. A packet forwarding method, comprising:

receiving a packet and storing the packet into a packet buffer;

reading the packet from the packet buffer, and analyzing the packet to extract part of content of the packet to generate specific data; and writing the specific data into a first buffer of a storage device, and writing the packet into a second buffer of the storage device;

wherein the storage device comprises a plurality of first descriptors and corresponding first buffers, and a plurality of second descriptors and corresponding second buffers; and the packet forwarding method further comprises:

reading one of the plurality of first descriptors, and writing the specific data into the corresponding first buffer according to content of the first descriptor; and reading one of the plurality of second descriptors, and writing the packet into the corresponding second buffer according to the content of the second descriptor;

wherein the storage device comprises a first memory and a second memory, a speed of the first memory is faster than a speed of the second memory, the plurality of first descriptors and the corresponding first buffers are in the first memory, and the plurality of second descriptors and the corresponding second buffers are in the second memory.

8. The packet forwarding method of claim 7, wherein the specific data comprises a source address of the packet and a destination address of the packet to be forwarded.

9. The packet forwarding method of claim 7, wherein the step of analyzing the packet to extract part of content of the packet to generate the specific data comprises:

analyzing the packet to extract at least part of headers corresponding to a plurality of layers in an Internet Protocol to generate the specific data.

10. The packet forwarding method of claim 9, wherein the step of analyzing the packet to extract part of content of the packet to generate the specific data comprises:

analyzing the packet to extract at least part of a wireless media access control (Wi-Fi MAC) header, an Ethernet header and a transmission control protocol (TCP) header, to generate the specific data.

11. The packet forwarding method of claim 7, further comprising:

writing first descriptor information into the first buffer, wherein the first descriptor information comprises a sequence tag, a packet tag and a length of the first descriptor information; and writing second descriptor information into the second buffer, wherein the second descriptor information comprises the sequence tag, the packet tag and a length of the second descriptor information.

12. The packet forwarding method of claim 7, further comprising:

reading the specific data from the first buffer, and analyzing the specific data to obtain a destination of the packet to be forwarded; and in a case of not analyzing the packet, reading the packet from the second buffer, and forwarding the packet according to the destination.

* * * * *